US010510464B1

United States Patent
Gronowski et al.

(10) Patent No.: US 10,510,464 B1
(45) Date of Patent: Dec. 17, 2019

(54) CONTINUOUSLY TRANSPOSED CONDUCTORS AND ASSEMBLIES

(71) Applicant: Essex Group, Inc., Atlanta, GA (US)

(72) Inventors: Bogdan Gronowski, Fort Wayne, IN (US); David Marshall Cain, Easley, SC (US); Matthew Leach, Fort Wayne, IN (US); Christopher Richardson, Fort Wayne, IN (US); Jason Dennis Stephens, Fort Wayne, IN (US)

(73) Assignee: Essex Group, Inc., Fort Wayne, IN (US)

( * ) Notice: Subject to any disclaimer, the term of this patent is extended or adjusted under 35 U.S.C. 154(b) by 0 days.

(21) Appl. No.: 16/217,833

(22) Filed: Dec. 12, 2018

Related U.S. Application Data

(60) Provisional application No. 62/607,988, filed on Dec. 20, 2017.

(51) Int. Cl.
| H01B 7/30 | (2006.01) |
| H01B 7/00 | (2006.01) |
| H01F 27/28 | (2006.01) |
| H02K 3/12 | (2006.01) |
| H02K 3/42 | (2006.01) |
| H01F 27/34 | (2006.01) |

(52) U.S. Cl.
CPC .......... *H01B 7/0009* (2013.01); *H01B 7/306* (2013.01); *H01F 27/2823* (2013.01); *H01F 27/34* (2013.01); *H02K 3/12* (2013.01); *H02K 3/42* (2013.01); *H01F 2027/2838* (2013.01)

(58) Field of Classification Search
CPC ......... H01B 7/06; H01B 7/0009; H01F 27/34; H01F 2027/2838; H02K 3/42; H02K 3/12

USPC ................................................. 174/128.1, 33
See application file for complete search history.

(56) References Cited

U.S. PATENT DOCUMENTS

| 3,252,117 A |   | 5/1966  | Fischer |            |
| 3,602,636 A |   | 8/1971  | Evans   |            |
| 3,818,308 A |   | 6/1974  | Tamari  |            |
| 4,128,779 A | * | 12/1978 | Salon ......................... H02K 3/14 |
|             |   |         |         | 310/213    |
| 4,329,539 A | * | 5/1982  | Tanaka ................... H01B 12/02 |
|             |   |         |         | 174/125.1  |
| 4,370,542 A |   | 1/1983  | Mills et al. |       |
| 4,431,860 A | * | 2/1984  | Perco ..................... H01B 7/306 |
|             |   |         |         | 174/113 A  |

(Continued)

OTHER PUBLICATIONS

Notification of Transmittal of the International Search Report and the Written Opinion of the International Searching Authority, or the Declaration for PCT/US 18/65180, dated Mar. 21, 2019.

(Continued)

*Primary Examiner* — Sherman Ng

(57) ABSTRACT

A continuously transposed conductor (CTC) cable may include a plurality of electrically insulated strands arranged in first and second stacks with the plurality of strands successively transposed between the first and second stacks. The plurality of strands may include at least one strand having a plurality of component strands that are arranged in third and fourth stacks with the plurality of component strands successively transposed between the third and fourth stacks. Each of the components strands may include a conductor and insulation formed at least partially around the conductor.

22 Claims, 8 Drawing Sheets

(56) References Cited

U.S. PATENT DOCUMENTS

| | | | |
|---|---|---|---|
| 5,215,698 A | | 6/1993 | Altimus |
| 5,962,945 A | * | 10/1999 | Krenzer ................ H01F 27/323 |
| | | | 174/10 |
| 6,247,225 B1 | * | 6/2001 | Snitchler ............... H01L 39/143 |
| | | | 174/125.1 |
| 6,657,122 B1 | | 12/2003 | Krenzer et al. |
| 2012/0279754 A1 | | 11/2012 | Rabbia |
| 2014/0049352 A1 | * | 2/2014 | Trimmel ............. H01F 27/2823 |
| | | | 336/223 |
| 2014/0062647 A1 | | 3/2014 | Trimmel et al. |
| 2014/0159518 A1 | | 6/2014 | Haldemann |
| 2014/0196930 A1 | | 7/2014 | De Bree et al. |
| 2015/0114676 A1 | | 4/2015 | Vienne et al. |
| 2015/0310960 A1 | * | 10/2015 | Leach .................... H01B 7/306 |
| | | | 310/179 |
| 2016/0111946 A1 | * | 4/2016 | Huwyler ................ H02K 15/12 |
| | | | 156/185 |
| 2017/0033631 A1 | | 2/2017 | Conley |
| 2018/0329389 A1 | | 11/2018 | Park |

OTHER PUBLICATIONS

Notification of Transmittal of the International Search Report and the Written Opinion of the International Searching Authority, or the Declaration for PCT/US2017/067542, dated Mar. 8, 2018.

Office Action for U.S. Appl. No. 15/848,240, dated Aug. 6, 2019.

\* cited by examiner

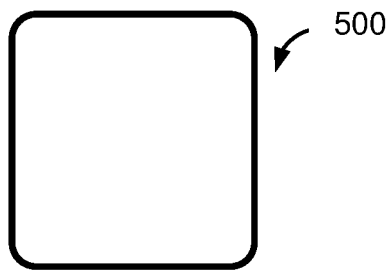
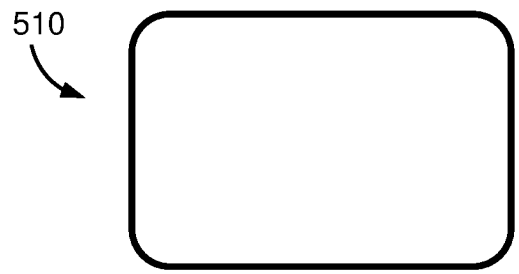
FIG. 5A    FIG. 5B
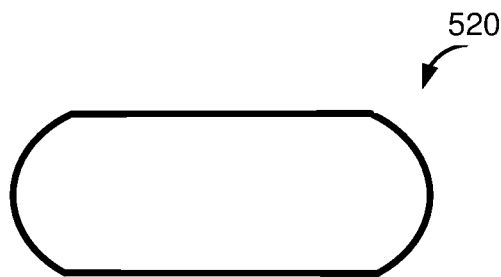
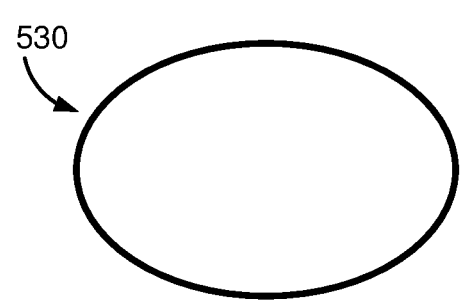
FIG. 5C    FIG. 5D
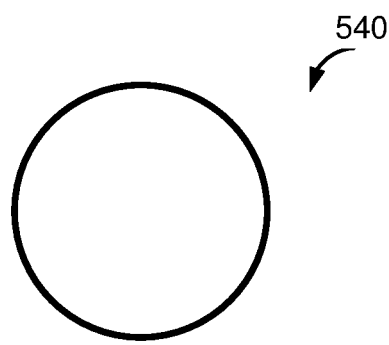
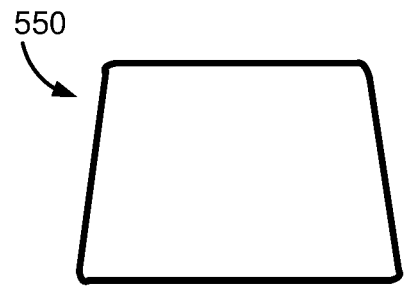
FIG. 5E    FIG. 5F

CONTINUOUSLY TRANSPOSED CONDUCTORS AND ASSEMBLIES

CROSS-REFERENCE TO RELATED APPLICATION

This application claims priority to U.S. Provisional Application No. 62/607,988, filed Dec. 20, 2017 and entitled "Continuously Transposed Conductors and Assemblies," the contents of which is incorporated by reference herein in its entirety.

TECHNICAL FIELD

Embodiments of the disclosure relate generally to continuously transposed conductors and, more particularly, to continuously transposed conductors including one or more strands formed from smaller continuously transposed conductors.

BACKGROUND

A continuously transposed conductor ("CTC") or CTC cable includes individually insulated strands that are typically arranged into two interposed stacks, and each strand is transposed in turn to each position within the cable. Each strand may successively and repeatedly take on each possible position within a cross-section of the CTC. As a result, each strand is effectively exposed to similar electromagnetic forces and losses are reduced in a winding formed from the CTC. In conventional CTC constructions, each strand typically includes a single conductor that is surrounded by insulation material. Due to the capabilities of transposition equipment, CTCs typically cannot be made with more than ninety-eight strands, thereby limiting the number of conductors in a CTC to ninety-eight conductors. A few CTC constructions have been developed in which each strand includes two or more bonded conductors. However, the bonded conductors longitudinally extend in parallel to one another, thereby leading to circulating losses, such as losses due to skin effect and eddy currents. Accordingly, there is an opportunity for improved CTCs, CTC cables, and/or CTC assemblies in which one or more strands are formed as smaller CTCs.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items; however, various embodiments may utilize elements and/or components other than those illustrated in the figures. Additionally, the drawings are provided to illustrate example embodiments described herein and are not intended to limit the scope of the disclosure.

FIGS. 5A-5F illustrate example cross-sectional shapes that may be utilized in association with CTC strands or conductors, according to various illustrative embodiments of the disclosure.

DETAILED DESCRIPTION

Various embodiments of the present disclosure are directed to continuously transposed conductors ("CTCs") and/or CTC cables in which one or more strands of the CTC are formed from smaller CTCs. In one example embodiment, a plurality of strands may be formed or otherwise provided. According to an aspect of the disclosure, one or more of the strands of an overall CTC may be formed as relatively smaller CTCs (referred to herein as CTC strands). Each CTC strand may include a plurality of transposed strands, and each strand of the CTC strand may include at least one conductive element covered by one or more suitable layers of insulation (e.g., polymeric enamel, extruded thermoplastic insulation etc.). Each CTC strand may include any number of component strands (e.g., between approximately three and approximately eleven strands, etc.), and each CTC strand may be formed with a wide variety of suitable dimensions, such as any suitable cross-sectional shape, cross-sectional area, width, or thickness.

Any number of CTC strands may be incorporated into a CTC, and a CTC may include any suitable number of total strands. In certain embodiments, all of the strands of the CTC may be formed as a CTC strand or smaller CTC. In other embodiments, only a portion of the strands of the CTC may be formed as CTC strands. Once a plurality of strands (e.g., CTC strands, other strands, etc.) are provided, the plurality of strands may be transposed in order to form the overall CTC.

As a result of incorporating CTC strands or smaller CTCs into an overall CTC, a number of conductors included in the CTC may be increased, thereby reducing losses related to skin effect. Additionally, circulating current losses may be reduced. A CTC incorporating one or more CTC strands may be utilized in a wide variety of suitable applications including, but not limited to, transformers, alternating current ("AC") generators, rotating electric machines, motors, load reactors, electrical devices, etc.

Embodiments of the disclosure now will be described more fully hereinafter with reference to the accompanying drawings, in which certain embodiments of the disclosure are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
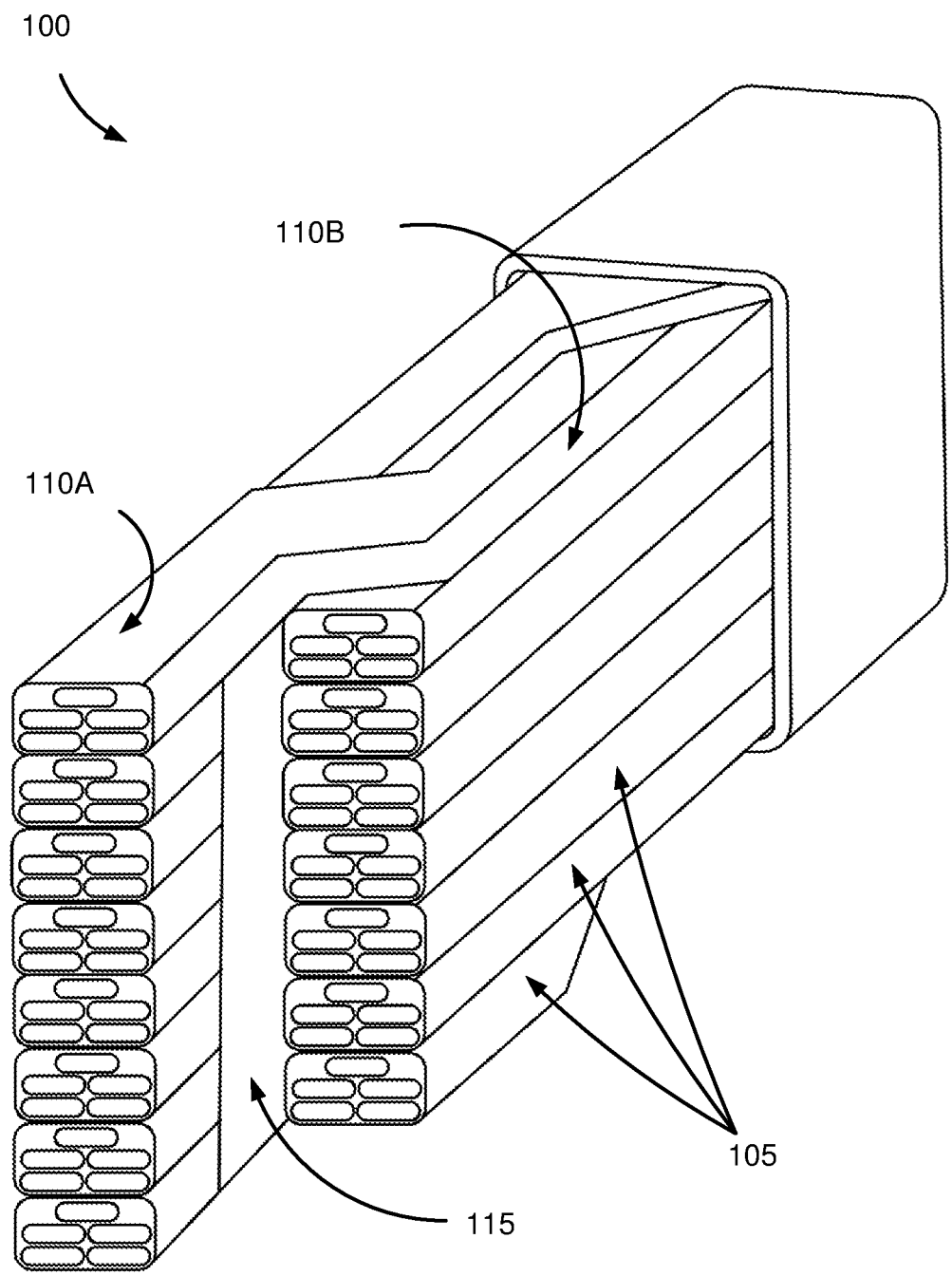
FIG. 1 is a perspective view of an example CTC cable, according to an illustrative embodiment of the disclosure.

With reference to FIG. 1, a perspective view of an example CTC cable 100 or CTC 100 is illustrated in accordance with an embodiment of the disclosure. The CTC cable 100 (also referred to as a multiple parallel conductor cable) may be formed from a plurality of strands 105. In accordance with an aspect of the disclosure, one or more of the plurality of strands 105 may be formed as a smaller CTC. A strand formed as a smaller CTC (e.g., a CTC having a smaller cross-sectional area than the overall CTC 100, etc.) may be referred to herein as a CTC strand 105.

The CTC cable 100 may be formed with any suitable number of strands 105. In various embodiments, the CTC cable 100 may be formed with approximately 3, 5, 6, 7, 11, 15, 19, 25, 30, 40, 50, 60, 72, 81, 85, 98, or 100 strands, or a number of strands included in a range between any two of the above values. For example, the CTC cable 100 may be formed with between five (5) and eighty-five (85) strands or with between three (3) and eleven (11) strands. In certain embodiments, the number of strands utilized may be based at least in part upon any number of application-specific factors including, but not limited to, the size of the strands, a length of a slot into which the CTC cable 100 is inserted, a desired degree of rotation of the CTC cable 100, etc.

Any number of the strands 105 may be formed as CTC strands. As shown in FIG. 1, in certain embodiments, each strand 105 of the CTC cable 100 may be formed as a CTC strand. In other embodiments, only a portion of the strands 105 may be formed as CTC strands. Other strands may then be formed with other suitable constructions. For example, one or more other strands may be formed with single conductors surrounded by insulation material, with multiple non-transposed conductors (e.g., multiple conductors that are joined together and/or that extend parallel to one another in a longitudinal direction), or as strands that do not include conductors (e.g., one or more fillers, etc.).

In certain embodiments, the strands 105 may be arranged into two stacks, such as side-by-side stacks 110A, 110B. At least a portion of the strands 105 may then be interposed between the two stacks 110A, 110B. For example, the strands 105 may be interposed such that each strand successively and repeatedly takes on each possible position within a cross-section of the CTC cable 100. In certain embodiments, the plurality of strands 105 may be connected in parallel at their ends, for example, when incorporated into a desired application.

Any number of suitable strands 105 may be transposed at a time, such as one or two strands. For example, a top and/or a bottom strand may be transposed at a time. In certain embodiments, at any given cross-sectional point along a longitudinal length of the CTC cable 100, one or two strands may be transposed or in the process of being transposed. Strands may be transposed with any suitable pitch and/or configuration. The pitch of a transposition may correspond to a distance along a longitudinal length of the CTC cable 100 required to transpose a strand from one position (e.g., a first stack) to another position (e.g., a second stack). Example transposition pitches include, but are not limited to, approximately 0.25, 0.50, 0.75, 1.0, 1.25, 1.5, 1.75, 2.0, 2.1, 2.25, 2.50, 2.75, 3.0, 3.50, 4.0, 4.50, or 5.0 inches, a pitch included in a range between any two of the above values, or a pitch included in a range bounded on either a minimum or maximum end by one of the above values.

Optionally, a separator 115 may be positioned between the two stacks 110A, 110B. The separator 115 may be formed from a wide variety of suitable materials and/or combination of materials including, but not limited to, a paper strip, Nomex®, Kapton, a polymeric film layer, an extruded polymeric layer, one or more aramid materials, glass, glass tape, and/or any suitable dielectric material(s). In certain embodiments, a separator 115 may be formed from one or more materials having a desired thermal class (e.g., NEMA Class A, B, F, H, N, R, S, etc.) and/or from one or more materials that result in the separator 115 being compatible with a desired application for the CTC cable 100. For example, the separator 115 may be designed to be compatible with certain fluids or other materials that the CTC cable 100 may be exposed to when incorporated into a device.

In certain embodiments, the circulating current within a CTC application, and consequently, an optimum transposition angle and/or pitch may depend at least in part upon the slot width, the length of the stator slot, the number of strands in the stack of a CTC cable 100, the length of strands, the leakage flux in the slot and/or in the end-winding area, the end-winding diameter, and/or any number of other suitable factors. The transpositions may assist in reducing or limiting the circulating currents and/or circulating losses within the CTC cable 100. A wide variety of suitable transposition arrangements may be utilized. For certain rotating machines, the best results in reducing circulating losses may be achieved with approximately 540° of rotation in and/or along the slot. In other machines, the best results may be achieved with approximately 900° of rotation. A desired or optimal rotation may be independent of the number of strands included in a CTC cable 100. In other words, a transposition pitch may be based at least in part on a number of strands in a CTC cable 100 in order to attain a desired rotation.

The CTC cable 100 may be formed with any suitable cross-sectional shape. For example, the CTC cable 100 may be formed with the illustrated rectangular overall cross-sectional shape. In other embodiments, a CTC cable 100 may be formed with a square, elliptical, trapezoidal, hexagonal, octagonal, polygonal, or any other suitable overall cross-sectional shape. As desired, one or more fillers may be added in order to maintain a desired cross-sectional shape (e.g., a rectangular shape, etc.). For example, one or more fillers may be incorporated in order to fill any gaps between transposed strands 105 and/or to provide the CTC cable 100 with a desired overall cross-sectional shape, such as a desired rectangular shape. Filler(s) may be positioned at any suitable locations within a CTC cable 100 and/or adjacent to the strands 105 of a CTC cable 100. For example, fillers may be positioned at the top and/or the bottom of a CTC cable 100 within one or both of the stacks of strands. Any number of suitable fillers may be utilized and, in certain embodiments, the number of fillers may be based at least in part upon the number of transpositions that are made at a time within the CTC cable 100.

A filler may be formed from a wide variety of suitable materials and/or combination of materials. In various embodiments, a filler may be formed from one or more suitable dielectric materials or semi-conductive materials, such as any of the materials discussed herein. In certain embodiments, one or more fillers may be inserted, extruded, or applied after various transpositions are made. In other embodiments, one or more fillers may be inserted after a desired longitudinal length of the CTC cable 100 including a plurality of transpositions has been manufactured. For example, a filler may be added prior to applying an outer wrap or coating. In yet other embodiments, an outer coating may be extruded or formed such that it fills in any gaps in the CTC cable 100.

Additionally, the CTC cable 100 may be formed to have any suitable cross-sectional area and/or dimensions. For example, the CTC cable 100 may have a cross-sectional area of approximately 0.017, 0.025, 0.05, 0.075, 0.10, 0.20, 0.25, 0.30, 0.40, 0.50, 0.60, 0.70, 0.80, 0.90, 1.0, 1.25, 1.50, 1.647, 1.75, 2.0, 2.25, 2.5, 2.70, 2.80, 3.0, 3.25, 3.293, 3.50, or 4.0 inches, a cross-sectional area included in a range between any two of the above values, or a cross-sectional area included in a ranged bounded on either a minimum or maximum end by one of the above values.

Each strand (hereinafter referred to individually as strand 105) of the CTC cable 100 may be formed with a wide variety of suitable constructions, layers, materials, and/or dimensions. In accordance with an aspect of the disclosure, at least one strand 105 may be formed as a CTC strand. Example CTC strands that may be incorporated into the CTC cable 100 are described in greater detail below with reference to FIGS. 2-5F. As set forth above, in certain embodiments, all of the strands 105 may be formed as CTC strands. In other embodiments, only a first portion of the strands 105 may be formed as CTC strands while a second portion of the strands are formed as non-CTC strands. Non-CTC or other strands may be formed with a wide variety of suitable constructions. For example, one or more non-CTC strands may be formed with single conductors surrounded by insulation material. A wide variety of conductors and/or insulation materials may be utilized, such as any of the conductors and/or insulation materials discussed below with reference to the CTC strand 200 of FIG. 2 and/or the strand constructions of FIGS. 3A-3C. As another example, one or more non-CTC strands may be formed with multiple conductors that are not transposed, such as multiple conductors that are joined together and/or that extend parallel to one another in a longitudinal direction. A few non-limiting examples of strands that include a plurality of joined conductors are discussed in greater detail below with reference to FIGS. 4A-4B. In other embodiments, one or more strands may be formed without conductors. For example, one or more fillers (e.g., dielectric fillers, etc.) may be substituted for non-CTC strands.

Regardless of the layer and/or material construction of a strand 105, the strand 105 may be formed with any desired cross-sectional shape and/or dimensions. As shown in FIG. 1, a strand 105 may be formed with a rectangular cross-sectional shape. In other embodiments, a strand 105 may be formed with a square, elliptical, trapezoidal, hexagonal, octagonal, polygonal, or any other suitable cross-sectional shape. Additionally, each strand 105 may be formed with any suitable cross-sectional area. For example, a strand may have a cross-sectional area of approximately 1.0, 0.90, 0.80, 0.75, 0.70, 0.60, 0.50, 0.40, 0.35, 0.31, 0.30, 0.25, 0.20, 0.15, 0.10, 0.09, 0.08, 0.07, 0.06, 0.05, 0.04, 0.03, 0.025, 0.020, 0.015, or 0.010 square inches, a cross-sectional area included in a range between any two of the above values, or a cross-sectional area included in a range bounded on either a minimum or maximum end by one of the above values (e.g., a cross-sectional area that is less than approximately 0.20 square inches, etc.). Additionally, given the wide variety of different cross-sectional shapes that may be utilized, strands 105 may be formed with a wide variety of suitable cross-sectional dimensions (e.g., width, thickness, diameter, etc.).

Following transposition of a CTC cable 100, an outer wrap or coating 120 may optionally be formed around or at least partially around the CTC cable 100. In certain embodiments, an outer wrap, such as a paper wrap or an insulating tape (e.g., a Kapton tape, a Nomex® tape, etc.), may be wrapped or otherwise formed around the CTC cable 100. In other embodiments, an extruded coating may be formed around or at least partially around the CTC cable 100. The extruded coating may be formed from a wide variety of suitable materials and/or combination of materials, such as any of the materials described below with reference to an example CTC strand. For example, the extruded coating may be formed from PEEK, PAEK, PPSU, PI, materials having a desired thermal class (e.g., NEMA Class A, B, F, H, N, R, S, etc.) or other properties, and/or other suitable materials. Additionally, the extruded coating may be formed with any suitable thickness, such as a thickness of approximately 0.001, 0.002, 0.003, 0.004, 0.005, 0.006, 0.007, 0.008, 0.009, 0.010, 0.020, 0.025, 0.0295, 0.030, 0.035, 0.0394, or 0.04 inches, a thickness included in a range between any two of the above values, or a thickness included in a range bounded on either a minimum or maximum end by one of the above values.

An extruded coating or other outer wrap may assist in holding the various strands of the CTC cable 100 together. Additionally, certain outer wraps or coatings may provide protection for the CTC cable 100. For example, an extruded coating may provide suitable fluid resistance in various applications. In certain embodiments, an extruded coating may facilitate alterations to the design of an electric machine or other application. For example, an extruded coating may act as suitable ground wall insulation. Thus, the extruded coating may allow a dedicated or separate ground wall insulation in an electric motor to be reduced or removed altogether, thereby simplifying the manufacturing operations and/or reducing the manufacturing and/or material cost of the motor.

The CTC cable 100 described above with reference to FIG. 1 is provided by way of example only. A wide variety of alternatives could be made to the illustrated cable 100 as desired in various embodiments. For example, a different number of strands, different types of strands, and/or a different strand configuration may be formed. The present disclosure envisions various CTC cable strand constructions and/or configurations that can be incorporated into a wide variety of different CTC cables.

In accordance with an aspect of the disclosure, at least one CTC strand may be incorporated into a CTC cable, such as the CTC cable 100 of FIG. 1. A CTC strand may be formed as a CTC having a smaller cross-sectional area than the overall CTC cable 100 into which it is incorporated. The CTC strand may be transposed with other CTC strands (and/or strands having other constructions) in order to form an overall CTC cable 100. A CTC strand may be formed with a wide variety of suitable constructions. One example CTC strand is described in greater detail below with reference to FIG. 2. Various components of CTC strands are then described in greater detail below with reference to FIGS. 3A-5F.

Figure 2:
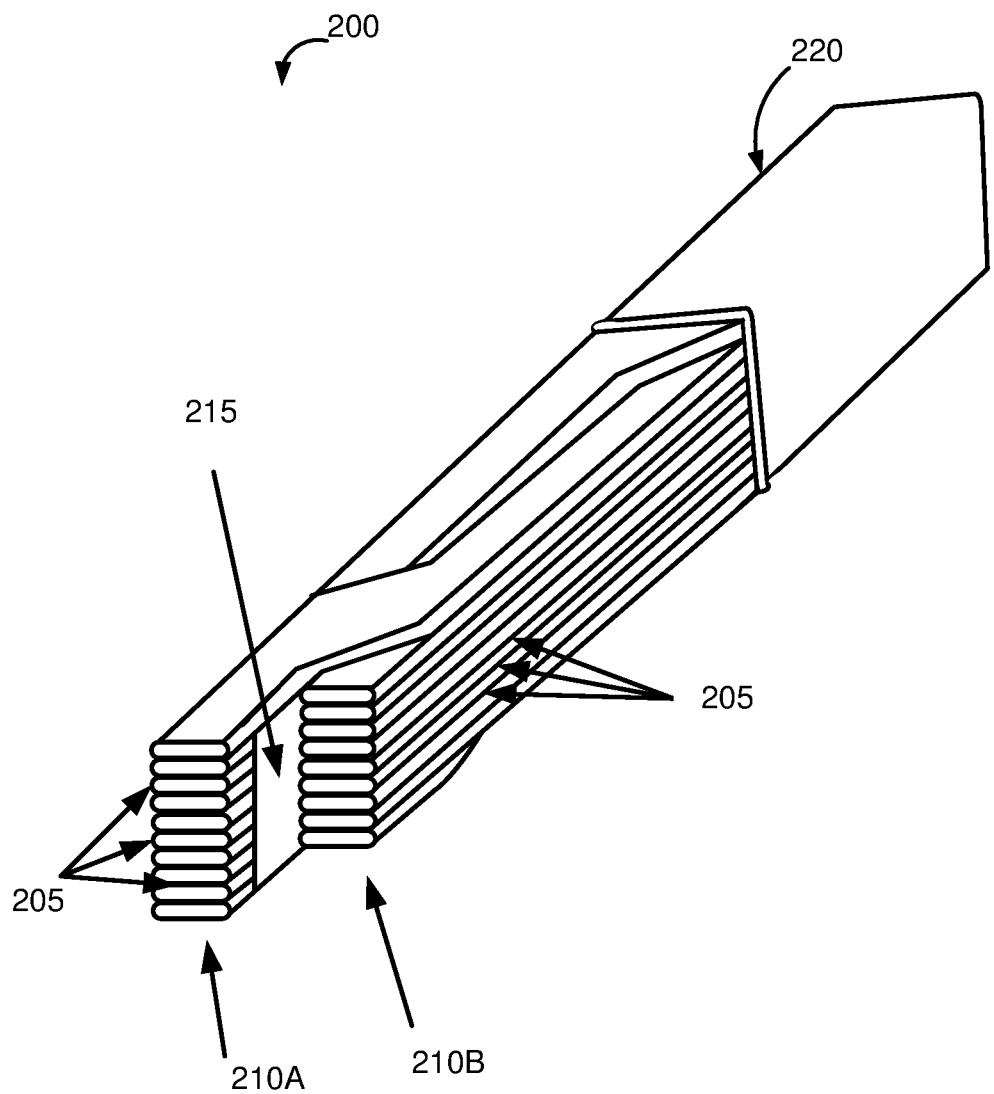
FIG. 2 is a perspective view of an example CTC strand, according to an illustrative embodiment of the disclosure.
Figure 4A:
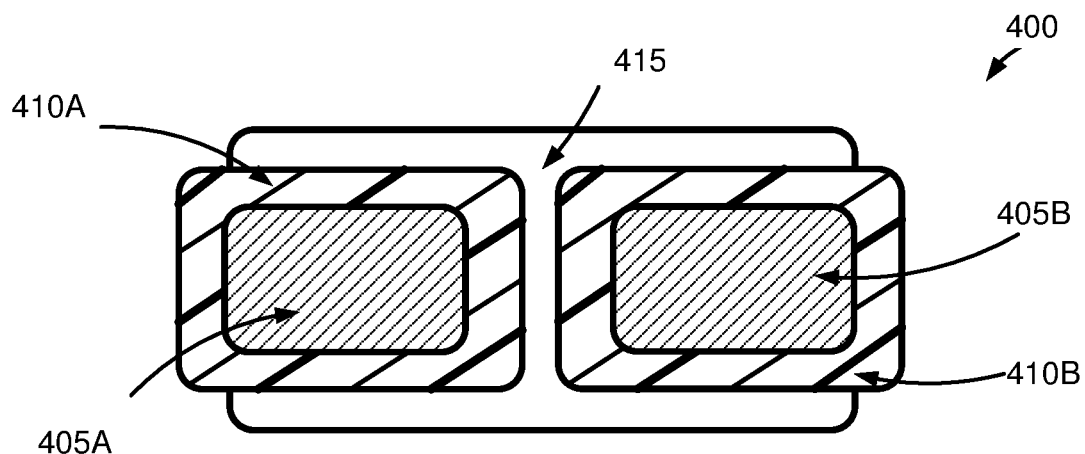
FIGS. 4A-4B illustrate example cross-sectional views of example multi-conductor strands that may be incorporated into a CTC strand, according to various illustrative embodiments of the disclosure.
Figure 4B:
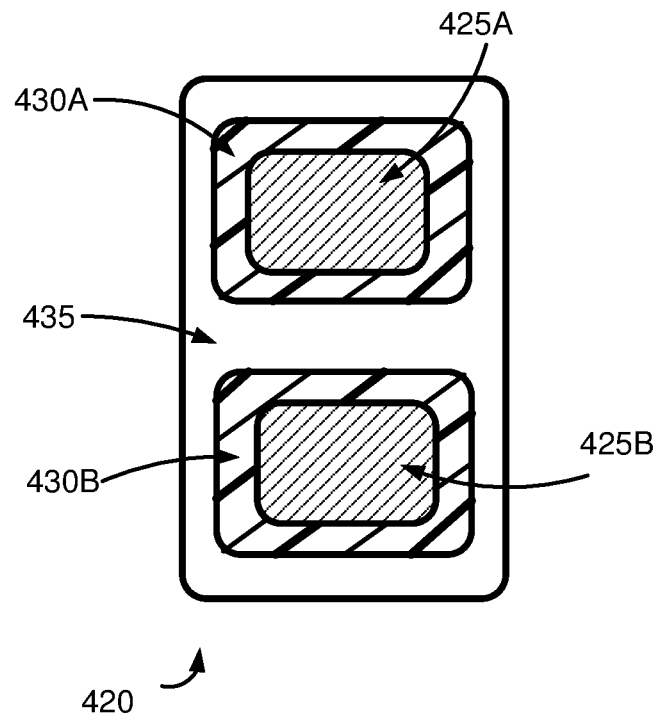

FIG. 2 illustrates a perspective view of an example CTC strand 200 in accordance with an embodiment of the disclosure. The CTC strand 200 may itself be formed from a plurality of component strands 205 or partial conductors that are transposed together. In certain embodiments, each component strand 205 may include a single individually insulated conductor. In other embodiments, as shown in FIGS. 4A-4B, one or more component strands may include a plurality of individually insulated conductors. Each component strand (generally referred to as strand 205) may be individually insulated such that the component strands are electrically isolated from one another.

The CTC strand 200 may be formed with any suitable number of component strands 205 as desired in various embodiments. In certain embodiments, the CTC strand 200 may be formed with approximately 3, 5, 6, 7, 11, 15, 19, 25, 30, 40, 50, 60, 72, 81, 85, 98, or 100 component strands, or a number of component strands included in a range between any two of the above values. For example, the CTC strand 200 may be formed with between five (5) and eighty-five (85) component strands or between three (3) and eleven (11) component strands. In certain embodiments, the CTC strand 200 may be formed with five (5) or seven (7) component strands. The CTC cable 100 of FIG. 1 illustrates CTC strands 105 that are each formed with five component strands; however, any other suitable number of component strands may be utilized. In certain embodiments, the number of component strands utilized may be based at least in part upon any number of application-specific factors including, but not limited to, the size of the strands, a size of the CTC cable into which the CTC strand 200 is incorporated, a desired degree of rotation for the CTC cable, etc.

In certain embodiments, the component strands 205 may be arranged into two stacks, such as side-by-side stacks 210A, 210B. At least a portion of the component strands 205 may then be interposed between the two stacks 210A, 210B. For example, the component strands 205 may be interposed such that each strand successively and repeatedly takes on each possible position within a cross-section of the CTC strand 200. Additionally, in certain embodiments, the plurality of component strands 205 may be connected in parallel at their ends, for example, when incorporated into a CTC cable and/or a desired application.

Optionally, a separator 215 may be positioned between the two stacks 210A, 210B. The separator 215 may be formed from a wide variety of suitable materials and/or combination of materials including, but not limited to, a paper strip, Nomex®, Kapton, a polymeric film layer, an extruded polymeric layer, one or more aramid materials, glass, glass tape, and/or any suitable dielectric material(s). In certain embodiments, a separator 215 may be formed from one or more materials having a desired thermal class (e.g., NEMA Class A, B, F, H, N, R, S, etc.) and/or from one or more materials that result in the separator 215 being compatible with a desired CTC application. For example, the separator 215 may be designed to be compatible with certain fluids or other materials.

Any number of suitable component strands 205 may be transposed at a time, such as one or two strands. For example, a top and/or a bottom component strand may be transposed at a time. In certain embodiments, at any given cross-sectional point along a longitudinal length of the CTC strand 200, one or two strands may be transposed or in the process of being transposed. One or more component strands may be transposed with any suitable pitch and/or configuration. The pitch of a transposition may correspond to a distance along a longitudinal length of the CTC strand 200 required to transpose a component strand from one position (e.g., a first stack) to another position (e.g., a second stack). Examples of suitable transposition pitches that may be utilized include, but are not limited to, approximately 0.10, 0.125, 0.20 0.25, 0.30, 0.35, 0.4, 0.45, 0.5, 0.55, 0.6, 0.65, 0.7, 0.75, 0.8, 0.85, 0.9, 0.95, 1.0, 1.2, 1.5, 2.0, 3.0, 4.0, 5.0 inches, a pitch included in a range between any two of the above values (e.g., a pitch included in a range between approximately 0.1 and approximately 1.0 inches, etc.), or a pitch included in a range bounded on either a minimum or maximum end by one of the above values (e.g., a pitch that is less than approximately 1.0 inch, etc.). In certain embodiments, a transposition pitch of a component strand 205 may be less than or equal to approximately 1.0 inch or approximately 0.80 inches.

Additionally, in certain embodiments, the circulating current within a CTC application, and consequently, an optimum transposition angle and/or pitch of the component strands of a CTC strand 200 may depend at least in part upon the slot width, the length of the stator slot, the number of component strands in the stack of a CTC strand 200, the length of component strands, the leakage flux in the slot and/or in the end-winding area, the end-winding diameter, and/or any number of other suitable factors. The transpositions may assist in reducing or limiting the circulating currents and/or circulating losses within a CTC strand 200 and/or CTC cable. A wide variety of suitable transposition arrangements may be utilized as desired. For various rotating machines, the best results in reducing circulating losses may be achieved with approximately 540° of rotation or approximately 900° of rotation in and/or along the slot. A desired or optimal rotation may be independent of the number of component strands in a CTC strand 200 and/or the number of strands (e.g., CTC strands, etc.) included in a CTC cable.

As shown in FIG. 2, a CTC strand 200 may be formed with a rectangular overall cross-sectional shape. In other embodiments, a CTC strand 200 may be formed with a square, elliptical, trapezoidal, hexagonal, octagonal, polygonal, or any other suitable overall cross-sectional shape. As desired, one or more fillers may be added in order to maintain a desired cross-sectional shape (e.g., a rectangular shape, etc.). For example, one or more fillers may be incorporated in order to fill any gaps between transposed component strands 205 and/or to provide the CTC strand 200 with a desired overall cross-sectional shape, such as a desired rectangular shape. Filler(s) may be positioned at any suitable locations within a CTC strand 200 and/or adjacent to the component strands 205 of a CTC strand 200. For example, fillers may be positioned at the top and/or the bottom of a CTC strand 200 within one or both of the stacks of strands. Any number of suitable fillers may be utilized and, in certain embodiments, the number of fillers may be based at least in part upon the number of transpositions that are made at a time within the CTC strand 200.

A filler may be formed from a wide variety of suitable materials and/or combination of materials. For example, a filler may be formed from one or more suitable dielectric materials or semi-conductive materials, such as any of the materials discussed herein. In certain embodiments, one or more fillers may be inserted, extruded, or applied after various transpositions are made. In other embodiments, one or more fillers may be inserted after a desired longitudinal length of the CTC strand 200 including a plurality of transpositions has been manufactured. For example, a filler may be added prior to applying an outer wrap or coating. In yet other embodiments, an outer coating may be extruded or formed such that it fills in any gaps in the CTC strand 200.

Additionally, a CTC strand 200 may have any suitable cross-sectional area and/or dimensions. For example, a CTC strand 200 may have a cross-sectional area that is less than approximately 1.0, 0.90, 0.80, 0.75, 0.70, 0.60, 0.50, 0.40, 0.35, 0.31, 0.30, 0.25, 0.20, 0.15, 0.10, 0.09, 0.08, 0.07, 0.06, 0.05, 0.04, 0.03, 0.025, 0.020, 0.015, or 0.010 square inches, a cross-sectional area included in a range between any two of the above values, or a cross-sectional area included in a range bounded on either a minimum or maximum end by one of the above values.

Figure 3A:
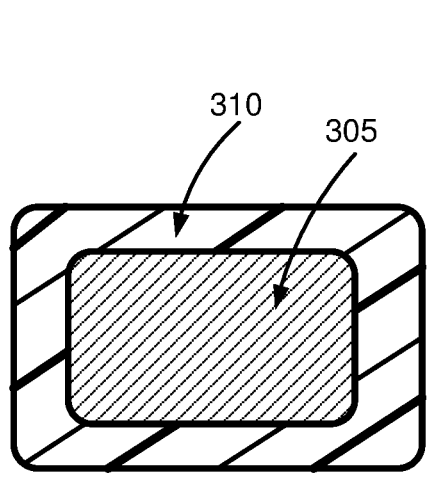
FIGS. 3A-3C are cross-sectional views of example conductors that can be incorporated into a CTC strand, according to illustrative embodiments of the disclosure.
Figure 3B:
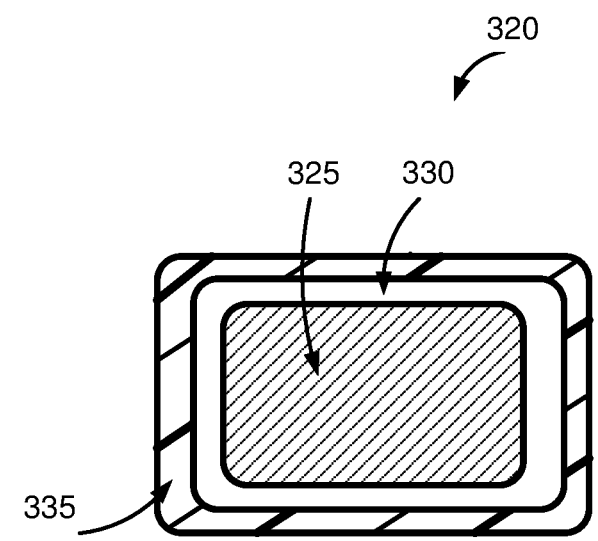
Figure 3C:
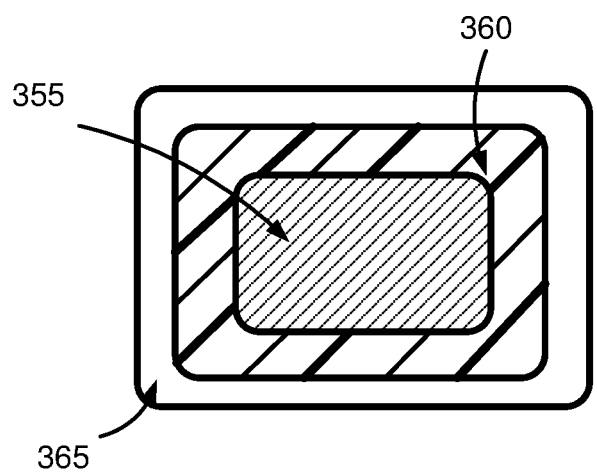

Each component strand 205 of a CTC strand 200 may include one or more insulated conductors. The component strands and/or conductors may include any desired cross-sectional shape, such as the rectangular shapes illustrated in FIG. 2. Additionally, a wide variety of suitable types of insulation may be utilized in association with the component strands 205. A few non-limiting examples of conductors, conductor shapes, and insulation materials that may be utilized to form component strands are described in greater detail below with reference to FIGS. 3A-5F. FIGS. 3A-3C illustrate example conductors and insulation materials. FIGS. 4A-4B illustrate a few example component strands that may include a plurality of substrands (e.g., multiple conductors, etc.). FIGS. 5A-5F illustrate example cross-sectional shapes that may be utilized in association with component strands as desired in various embodiments. The component strands 205 incorporated into a CTC strand, such as the CTC strand 200 of FIG. 2, may include any suitable shapes, sizes, number of conductors, and/or materials, and those discussed in FIGS. 3A-5F are not intended to be limiting.

In certain embodiments, each component strand 205 of a CTC strand 200 may be formed with a relatively small size compared to traditional CTC strands. In certain embodiments, each component strand may have a cross-sectional area that is less than or equal to approximately 0.02, 0.015, 0.012, 0.010, 0.0098, 0.009, 0.0085, 0.008, 0.0075, 0.007, 0.006, 0.0055, 0.005, 0.004, 0.003, 0.0025, 0.002, 0.001, or 0.0005 square inches, or a cross-sectional area included in a range between any two of the above values. For example, each component strand may have a cross-sectional area that is less than or equal to approximately 0.0030 square inches. Other suitable cross-sectional areas of component strands may be utilized as desired in other embodiments. Additionally, component strands may be formed with a wide variety of suitable cross-sectional dimensions. As one example, a component strand having a rectangular cross-sectional shape may have a width that is less than or equal to approximately 0.10 inches and a thickness that is less than or equal to approximately 0.030 inches. Other example widths for component strands include, but are not limited to, approximately 0.005, 0.01, 0.015, 0.0175, 0.02, 0.025, 0.03, 0.035, 0.04, 0.045, 0.05, 0.06, 0.07, 0.075, 0.08, 0.09, 0.10, 0.125, 0.15, 0.175, or 0.20 inches, a width included in a range between any two of the above values (e.g., a width included in a range between approximately 0.020 and approximately 0.10 inches, etc.), or a width included in a range bounded on either a minimum or maximum end by one of the above values. Other example thicknesses for component strands include, but are not limited to, approximately, 0.005, 0.006, 0.007, 0.008, 0.009, 0.01, 0.0125, 0.015, 0.0175, 0.02, 0.0225, 0.025, 0.0275, 0.03, 0.035, 0.04, 0.045, or 0.05 inches, a width included in a range between any two of the above values (e.g., a width included in a range between approximately 0.010 and 0.030 inches, etc.), or a width included in a range bounded on either a minimum or maximum end by one of the above values.

In certain embodiments, following transposition of a CTC strand 200, an outer wrap or coating 220 may optionally be formed around or at least partially around the CTC strand 200. In certain embodiments, an outer wrap, such as a paper wrap or an insulating tape (e.g., a Kapton tape, a Nomex® tape, etc.), may be wrapped or otherwise formed around the CTC strand 200. In other embodiments, an extruded coating may be formed around or at least partially around the CTC strand 200. The extruded coating may be formed from a wide variety of suitable materials and/or combination of materials, such as any of the materials described below for extruded strand insulation. For example, the extruded coating may be formed from PEEK, PAEK, PPSU, PI, materials having a desired thermal class (e.g., NEMA Class A, B, F, H, N, R, S, etc.) or other properties, and/or other suitable materials. Additionally, the extruded coating may be formed with any suitable thickness, such as a thickness of approximately 0.0005, 0.001, 0.0015, 0.002, 0.0025, 0.003, 0.0035, or 0.004, 0.005, 0.01, 0.02, 0.3, 0.4, 0.5, 0.6, 0.7, 0.8, 0.9, 1.0, 1.2, or 0.15 inches, a thickness included in a range between any two of the above values, or a thickness included in a range bounded on either a minimum or maximum end by one of the above values.

In certain embodiments, an extruded coating or other outer wrap may assist in holding the various component strands of the CTC strand 200 together. Additionally, certain outer wraps or coatings may provide protection for the CTC strand 200 when it is incorporated into a CTC cable and/or a desired application. For example, an extruded coating may provide transmission fluid or other fluid resistance in automotive and/or other applications. In certain embodiments, an extruded coating may facilitate alterations to the design of an electric machine or other application. For example, an extruded coating may act as suitable ground wall insulation. Thus, the extruded coating may allow a dedicated or separate ground wall insulation in an electric motor to be reduced or removed altogether, thereby simplifying the manufacturing operations and/or reducing the manufacturing and/or material cost of the motor.

In certain embodiments, specialized equipment may be utilized to form CTC strands in which the component strands have relatively small cross-sectional sizes. Indeed, conventional CTC formation equipment and/or transposition equipment is typically suitable to process and transpose strands having a minimum thickness of approximately 0.040 inches and a minimum width of approximately 0.120 inches. Additionally, the transposition pitch of conventional CTC equipment exceeds approximately one inch. In order to form CTC strands or structures from smaller component strands, specialized equipment may be developed and utilized that is capable of processing strands and forming transpositions with a suitable pitch.

The CTC strand 200 described above with reference to FIG. 2 is provided by way of example only. A wide variety of alternatives could be made to the illustrated CTC strand 200 as desired in various embodiments. For example, a different number of component strands, different types of component strands, and/or a different component strand configuration may be formed. The present disclosure envisions various CTC strand constructions that can be incorporated into a wide variety of different CTC cables.

As set forth above, component strands of a CTC strand, such as component strand 205, may be formed with a wide variety of suitable configurations. FIGS. 3A-3C illustrate cross-sectional views of example component strands that may be incorporated into CTC strands, such as the CTC strand 200 illustrated in FIG. 2. Non-CTC strands incorporated into a CTC cable (e.g., CTC cable 100) may be formed in a similar manner as desired. Each of the example component strands illustrated in FIGS. 3A-3C incorporate a single conductor and insulation material. FIG. 3A illustrates an example component strand 300 in which a single layer or type of insulation material is formed around a conductor. FIG. 3B illustrates an example component strand 320 in which a plurality of layers of different types of insulating materials are formed around a conductor. FIG. 3C illustrates an example component strand 350 in which insulation material (e.g., a single layer or multiple layers of insulation material, etc.) is formed on a conductor and a bond layer is formed on the insulation material. Each of the example component strands 300, 320, 350 are discussed in greater detail below; however, it will be recognized that other strand configurations may be formed in addition to those illustrated in FIGS. 3A-3C.

Turning first to FIG. 3A, a cross-sectional view of a first example component strand 300 is illustrated. The component strand 300 may include a conductor 305, and insulation material 310 may be formed around the conductor 305. The conductor 305 may be formed from a wide variety of suitable materials and/or combination of materials. For example, the conductor 305 may be formed from copper, annealed copper, oxygen-free copper, silver-plated copper, aluminum, copper clad aluminum, silver, gold, a conductive alloy, carbon nanotube(s), copper/carbon nanotube(s), copper clad carbon nanotubes, or any other suitable electrically conductive material. Additionally, the conductor 305 may be formed with any suitable dimensions and/or cross-sectional shapes, such as the illustrated rectangular cross-sectional shape, a square shape, an elliptical or oval shape, etc. A few example shapes are described in greater detail below with reference to FIGS. 5A-5F. As desired, the conductor 305 may have corners that are rounded, sharp, smoothed, curved, angled, truncated, or otherwise formed without altering a prevailing cross-sectional shape.

A wide variety of suitable techniques may be utilized to form or provide a conductor 305 including but not limited to, wire drawing, conform, continuous extrusion, additive manufacture, etc. In certain embodiments, the conductor 305 may be formed in tandem with the application of insulation material onto the conductor 305. In other embodiments, a conductor 305 with desired dimensions may be preformed or obtained, and insulation material 310 may be applied or formed in an off-line manner.

A wide variety of suitable types of insulation material 310 may be utilized as desired. In certain embodiments, the insulation material 310 may include one or more layers of enamel. An enamel layer is typically formed by applying polymeric varnish to the conductor 305 and then baking it in a suitable enameling oven or furnace. As desired, multiple layers of enamel may be applied to the conductor 305 until a desired number of enamel coats have been applied and/or until a desired enamel thickness or build has been achieved. Examples of suitable polymeric materials that may be utilized to form an enamel layer include, but are not limited to, polyvinyl acetal-phenolic, polyimide, polyamideimide, amideimide, polyester, polyesterimide, polysulfone, polyphenylenesulfone, polysulfide, polyphenylenesulfide, polyetherimide, polyamide, etc. In certain embodiments, a polyimide-based material (e.g., polyimide, polyamideimide, etc.) or a material including a polyimide precursor may be utilized, as these materials typically have relatively high heat resistance. Additionally, in certain embodiments, an enamel layer may be formed as a mixture of two or more materials. As desired, different enamel layers may be formed from the same material(s) or from different materials. For example, a first layer of enamel may be formed from a first material, and a second layer of enamel may be formed from a second material.

In other embodiments, the insulation 310 may include a suitable wrap or tape, such as a polymeric tape, a polyester wrap, or a polyester glass wrap. For example, a polyimide tape or other suitable tape may be utilized. As desired, additional materials or additives (e.g., another polymeric material, etc.) may be incorporated into, embedded into, or adhered to a tape. Additionally, a tape may include a wide variety of suitable dimensions, such as any suitable thickness and/or width.

In yet other embodiments, the insulation material 310 may be formed as extruded insulation material. In certain embodiments, a single layer may be extruded to form the insulation material 310. In other embodiments, the extruded insulation material 310 may be formed via a plurality of extrusion steps and/or include a plurality of layers. Any number of layers may be utilized, such as two, three, four, or more layers. Each layer may be formed from the same material or, alternatively, at least two layers may be formed from different materials. In certain embodiments, one or more other suitable materials may be positioned between any two extruded layers, such as adhesives, other insulation materials, etc. A wide variety of suitable materials and/or combination of materials may be utilized to form extruded insulation including, but not limited to, one or more suitable polymeric materials, thermoplastic resins or materials, and/or other suitable materials. For example, extruded insulation may be formed from and/or may include at least one of polysulfone, polyphyenylsulfone ("PPSU"), polysulfide, polyphenylene sulfide ("PPS"), polyetherketone ("PEK"), polyether-ether-ketone ("PEEK"), polyaryletherketone ("PAEK"), polyamide etherketone, thermoplastic polyimide, aromatic polyamide, extruded polyester, extruded polyketone, a fluoropolymer material, a fluoropolymer combined with a thermoplastic resin, etc. Additionally, extruded insulation material may be formed as a single material, a co-polymer, a blend of materials, or as any other suitable combination of materials.

Turning to FIG. 3B, another example component strand 320 is illustrated. One or more first or base layers of material 330 may be formed on a conductor 325, and an outer insulation material 335 may be formed over the one or more base layers 330. Indeed, any suitable number of layers of insulation material may be formed around a conductor 325. The conductor 325 may be similar to the conductor 305 discussed above with reference to FIG. 3A. The base layer(s) 330 may include any number of layers of suitable material, such as one or more layers of material with enhanced adhesive properties, one or more layers of polymeric insulation material, one or more semi-conductive layers, etc.

In the event that the base layer(s) 330 include insulation material, a wide variety of different types of insulation materials and/or combination of materials may be utilized. Additionally, any number of layers of insulation material may be utilized. In the event that multiple layers are utilized, the layers may be formed from the same material (or combination of materials) or, alternatively, at least two layers may be formed from different materials. In various embodiments, the base layer(s) 330 may include one or more layers of enamel, a suitable wrap or tape, and/or one or more extruded layers. Each of these layers may be similar to those discussed above with reference to FIG. 3A.

In other embodiments, the base layer(s) 330 may include one or more semi-conductive layers, such as a semi-conductive layer applied as an enamel layer or as an extruded layer. Alternatively, semi-conductive material may be incorporated into another layer of insulation (e.g., an enamel layer, an extruded layer, etc.). In certain embodiments, a semi-conductive layer may be formed from a material that combines one or more suitable filler materials with one or more base materials. Examples of suitable filler materials include, but are not limited to, suitable inorganic materials such as metallic materials and/or metal oxides (e.g., zinc, copper, aluminum, nickel, tin oxide, chromium, potassium titanate, etc.), and/or carbon black; suitable organic materials such as polyaniline, polyacetylene, polyphenylene, polypyrrole, other electrically conductive particles; and/or any suitable combination of materials. The particles of the filler material may have any suitable dimensions, such as any suitable diameters. Examples of suitable base materials include, but are not limited to, polyvinyl acetal-phenolic, polyimide, polyamideimide, amideimide, polyester, polyesterimide, polysulfone, polyphenylenesulfone, polysulfide, polyphenylenesulfide, polyetherimide, polyamide, or any other suitably stable high temperature thermoplastic or other material. Further, any suitable blend or mixture ratio between filler material and base material may be utilized. A semi-conductive layer may assist in equalizing voltage stresses in the insulation and/or dissipating corona discharges at or near the conductor 325. This dissipation or bleeding off of corona discharges and/or electrical stresses may improve dielectric performance and/or increase the partial discharge inception voltage ("PDIV") of the strand 320.

Following the formation of one or more base layer(s) 330, additional insulation 335 may be formed around the base layer(s) 330. The additional insulation 335 or outer insulation may be formed from a wide variety of suitable materials, for example, enamel or extruded materials. In certain embodiments, an extruded layer may be formed around the base layer(s) 330 (e.g., enamel, etc.). Further, in certain embodiments, the additional insulation 335 may be formed completely around an outer periphery the base layer(s) 330. In other embodiments, the additional insulation 335 may be selectively formed around a portion of the outer periphery.

Regardless of the insulation structure, in the event that a plurality of layers of insulation are formed around a conductor (e.g., multiple layers of enamel, an extruded layer over an enamel layer, etc.), a wide variety of suitable techniques may be optionally utilized to enhance inter-layer adhesion. Similar techniques may be utilized to enhance adhesion of an insulation layer or base insulation layer to a conductor. For example, one or more suitable bonding agents, adhesion promoters, or adhesive layers may be incorporated between two layers of insulation. As another example, a conductor or insulation layer (e g, enamel layer, etc.) may be treated via one or more suitable techniques including, but not limited to, plasma, corona, flame, and/or ion treatments, to improve bonding and adhesion of a subsequently formed insulation layer.

FIG. 3C illustrates yet another example component strand 350 in which insulation material 360 may be formed around a conductor 355, and one or more bond layers 365 may be formed on the insulation material 360. The insulation material 360 may include any suitable materials, combinations of materials, and/or layers of materials, as described above with reference to FIGS. 3A and 3B. The conductor 355 may also be similar to the conductor 305 of FIG. 3A. The bond layer(s) 365 may include one or more layers of a suitable material that facilitates thermosetting of a component strand 350. In any given CTC strand or CTC cable, any suitable percentage of the strands may optionally include a bond layer, such as approximately ninety percent (90%) or more of the strands. A bond layer 365 may be formed at least partially around a component strand 350, and a bond layer 265 may be formed from a material that has a lower melt temperature than the primary insulation or other outer insulation of the component strand 350. Once a winding or other desired structure is formed from a CTC cable, the cable may be heated in such a manner that the bond layer 365 is activated to assist in maintaining a desired structural shape.

A bond layer 365 may be formed from a wide variety of suitable materials and/or combination of materials. In certain embodiments, the bond layer 365 may be formed from an epoxy coating, hot melt adhesive, or any other suitable thermosetting material. Examples of suitable bond layer materials include, but are not limited to, penoxy resin, cross-linking phenoxy, phenoxy associates, polysulfone, and/or similar materials. Additionally, a bond layer 365 may be formed with any suitable thickness. For example, a bond layer may be formed with a thickness between approximately 0.0005 inches (13 μm) and approximately 0.010 inches (254 μm).

Regardless of the number and/or types of insulation layers utilized in a component strand (e.g., any of component strands 205, 300, 320, 350, etc.), the insulation material, or any given layer of insulation material, may be formed with any suitable thickness. For example, insulation material may be formed with a thickness between approximately 0.001 inches and approximately 0.02 inches. In various embodiments, insulation material may have a thickness of approximately 0.001, 0.002, 0.003, 0.005, 0.006, 0.008, 0.01, 0.015, 0.02, 0.025, 0.03, 0.035, 0.04, or 0.05 inches, a thickness included in a range between any two of the above values, or a thickness included in a range bounded on either a minimum or maximum end by one of the above values. Additionally, in certain embodiments, insulation material may be formed to have a cross-sectional shape similar to that of the underlying conductor. For example, if a conductor has a rectangular cross-sectional shape, insulation material may be formed to preserve the rectangular cross-sectional shape. In other embodiments, insulation material may be formed with a different cross-sectional shape than the underlying conductor. For example, a conductor may be formed with an elliptical or non-rectangular cross-sectional shape while insulation material is formed in a way that results in the insulated conductor having a rectangular cross-sectional shape.

In certain embodiments, insulation material may be formed completely around a component strand. In other embodiments, insulation material may be formed partially around a component strand. For example, insulation material may be selectively formed on edges or surfaces of a component strand that may contact one or more adjacent component strands when the strands are incorporated into a CTC strand. In this regard, an amount of utilized insulation material and overall cost of a CTC strand and/or CTC cable may be reduced.

As desired, a component strand (e.g., any of strands 205, 300, 320, 350, etc.) and/or a CTC strand that incorporates the component strand may have a relatively high thermal index rating. In other words, a strand may be suitable for relatively continuous use at elevated temperatures without the insulation breaking down. In certain embodiments, a strand may have a thermal index rating of at least approximately 105° C., 120° C., 150° C., 175° C., 200° C. (Class N), 220° C. (Class R), 230° C., 240° C. (Class S), or higher and therefore, be suitable for relatively continuous use at temperatures up to a desired temperature without degradation of the insulation within an expected period of time (e.g., 1,000 hours, 5,000 hours, 20,000 hours, etc.), such as a time period set forth in an applicable standard (e.g., ASTM 2307, etc.). A desired thermal index rating may be determined based at least in part on an intended application for a CTC cable.

In certain embodiments, insulation material may be formed or applied such that it has a relatively uniform thickness along an outer periphery and/or a longitudinal length of a component strand. In other words, insulation material may be formed with a target concentricity that is approximately close to 1.0. The concentricity of the insulation material is the ratio of the maximum and minimum thickness of the material at any given cross-sectional point along a longitudinal length of a component strand. In various embodiments, insulation material may be formed with a concentricity of approximately 1.0, 1.01, 1.02, 1.03, 1.04, 1.05, 1.07, 1.09, 1.1, 1.2, 1.3, 1.4, 1.5, 1.6, 1.7, 1.8, a concentricity included in a range between any two of the above values, or a concentricity included in a range bounded on a maximum end by any one of the above values.

Although the example component strands 205, 300, 320, 350 illustrated in FIGS. 2 and 3A-3C incorporate a single conductor, in certain embodiments, a component strand may include a plurality of individually insulated conductors that are bonded, joined, or otherwise grouped together. Similarly, a non-CTC strand of a CTC cable may include a plurality of individually insulated conductors that are bonded, joined or otherwise grouped together. The use of a plurality of conductors to form a component strand or other strand may further mitigate the effects of skin effect within a CTC strand or CTC cable. FIGS. 4A-4B illustrate example cross-sectional shapes of component strands that include a plurality of joined conductors. Turning first to FIG. 4A, a first example component strand 400 is illustrated. The illustrated component strand 400 includes two conductors 405A, 405B, and each conductor may be electrically isolated from the other conductor. Additionally, the two conductors 405A, 405B may be bonded together.

As shown, respective insulation material may be formed around each of the two conductors 405A, 405B. For example, first insulation material 410A may be formed around the first conductor 405A, and second insulation material 410B may be formed around the second conductor 405B. The insulation material may include any suitable insulation material, such as any of the insulation materials discussed above. Once insulation has been formed around each conductor 405A, 405B, the two conductors 405A, 405B may be joined together side by side with a suitable joining coating 415. A wide variety of suitable materials and/or combination of materials may be utilized to form a joining coating 415. These materials include, but are not limited to, epoxy materials, thermoplastic resins, extruded materials, and/or adhesive materials.

In certain embodiments, the joining coating 415 may be formed between and/or around the two conductors 405A, 405B. As shown in FIG. 4A, in other embodiments, the joining coating 415 may be formed between and partially around (e.g., at least partially along the flat surfaces) the two conductors 405A, 405B. In yet other embodiments, the joining coating 415 may be formed only between the two conductors 405A, 405B. In yet other embodiments, a separate joining coating may not be utilized. For example, when insulation material (e.g., extruded insulation material, etc.) is formed, the insulation material may be formed between and around the conductors 405A, 405B in order to both individually insulate and join the conductors 405A, 405B.

FIG. 4B illustrates a second example component strand 420 that includes a plurality of joined conductors. The component strand 420 of FIG. 4B may be similar to that of FIG. 4A; however, in the strand 420 of FIG. 4B, the two conductors 425A, 425B may be positioned flat by flat (e.g., the conductors are joined along the longer or flat edges) rather than side by side. Similar to the component strand 400 of FIG. 4A, each conductor 425A, 425B may include respective insulation material 430A, 430B. Additionally, the two conductors may be joined together via a suitable joining coating 435. As shown, the joining coating 435 may be positioned between and around the two conductors; however, as set forth above, different joining coating configurations may be utilized. In other embodiments, the two conductors 425A, 425B may be joined together without a separate joining coating.

Although the example component strands 400, 420 illustrated in FIGS. 4A and 4B depict two conductor strands, in other embodiments, any desired number of conductors may be incorporated into a strand, such as three, four, five, six, eight, nine, or another number of conductors. As a result of incorporating a plurality of conductors into a component strand, it may be possible to produce a CTC strand and/or a CTC cable with a higher number of total conductors while reducing the number of component strands and/or other strands to be transposed.

Additionally, a component strand (or other strand), such as any of the strands illustrated in FIGS. 2-4B, may be formed with any suitable cross-sectional shape. FIGS. 5A-5F illustrate a few non-limiting examples of suitable cross-sectional shapes. Turning first to FIG. 5A, an example strand 500 having a square shape is illustrated. FIG. 5B illustrates an example strand 510 having a rectangular cross-sectional shape. FIG. 5C illustrates an example strand 520 having a rectangular central portion with curved or rounded edges. In other words, two sides of the strand may be relatively flat while the other edges or sides of the strand may be curved, arcuate, rounded, or elliptical. FIG. 5D illustrates an example strand 530 having an elliptical cross-sectional shape. FIG. 5E illustrates an example strand 540 having a circular cross-sectional shape. FIG. 5F illustrates an example strand 550 having a trapezoidal cross-sectional shape. A wide variety of other suitable cross-sectional shapes may be utilized as desired, such as triangular, parallelogram, hexagonal, octagonal, polygonal, semi-circular, semi-circular, etc. Additionally, as set forth above, one or more of the corners of a strand may be rounded, curved, angled, or truncated.

A wide variety of alternatives could be made to the illustrated component strands and/or other strands as desired in various embodiments. Indeed, the present disclosure envisions a wide variety of suitable strand constructions. Other embodiments may include any suitable number of conductors, dimensions, cross-sectional shapes, insulation material(s), and/or combination of layers (e.g., insulation layer(s), bond layers, adhesive layers, etc.).

Figure 6:
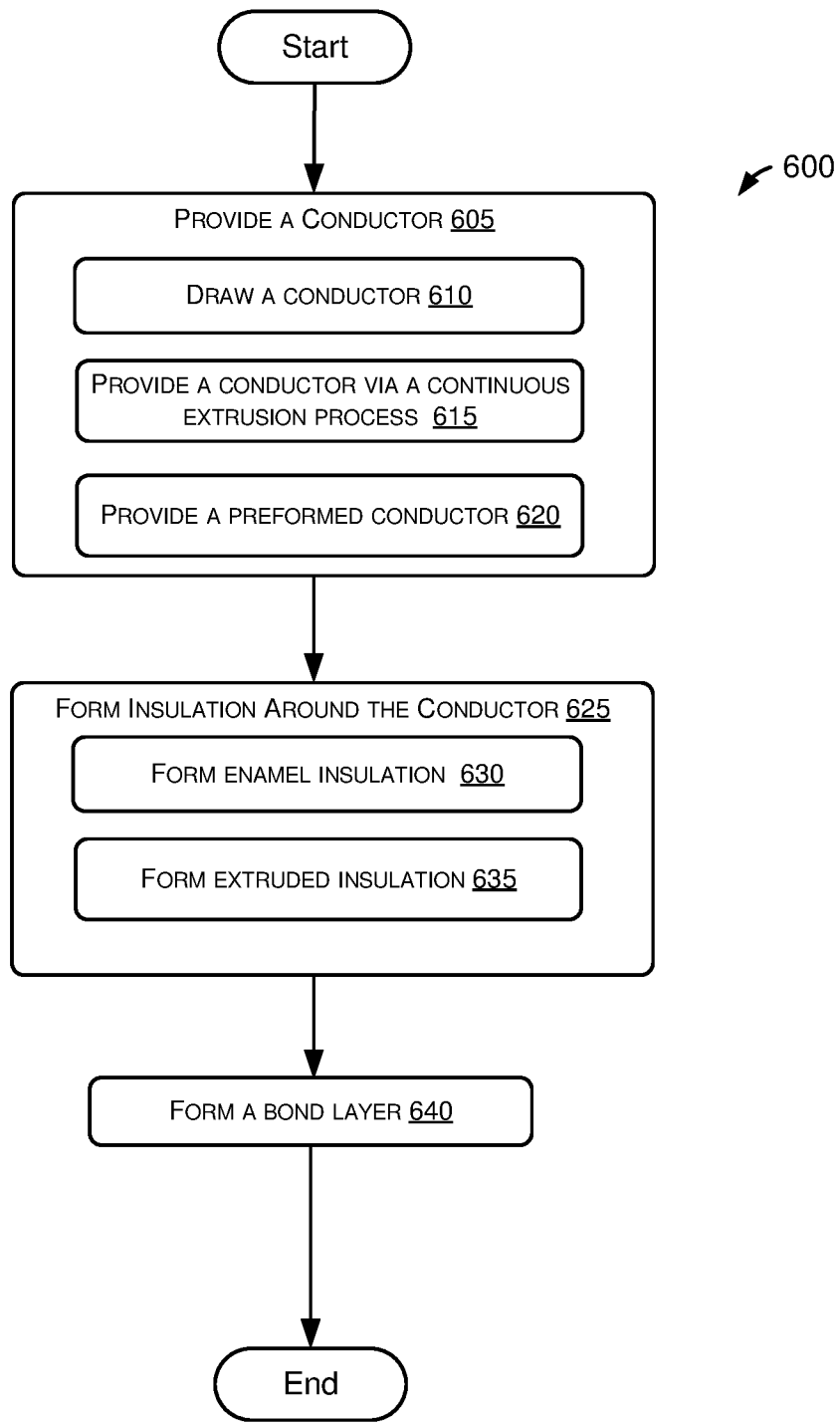
FIG. 6 illustrates a flow chart of an example method for forming a strand of a CTC strand to be incorporated into a larger CTC, in accordance with an illustrative embodiment of the disclosure.
Figure 7:
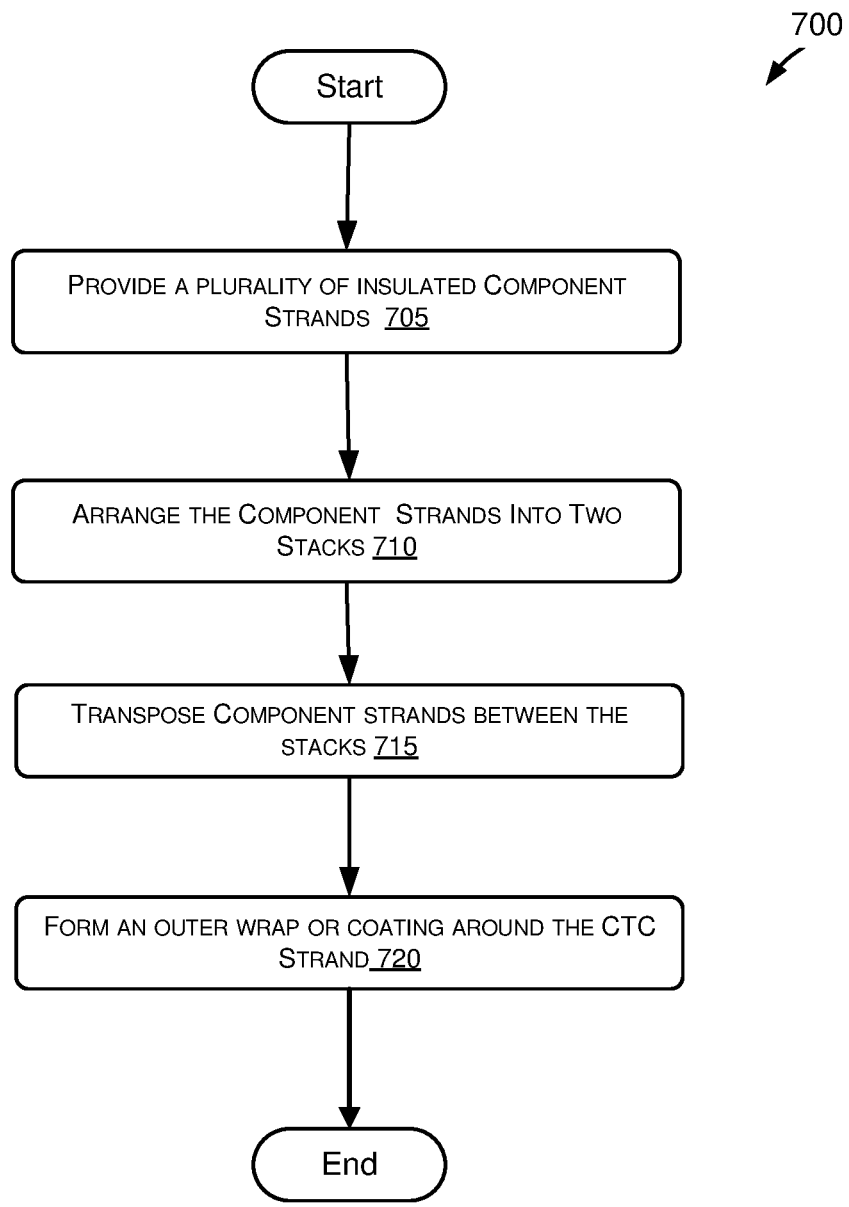
FIG. 7 illustrates a flow chart of an example method for forming a CTC strand, in accordance with an illustrative embodiment of the disclosure.
Figure 8:
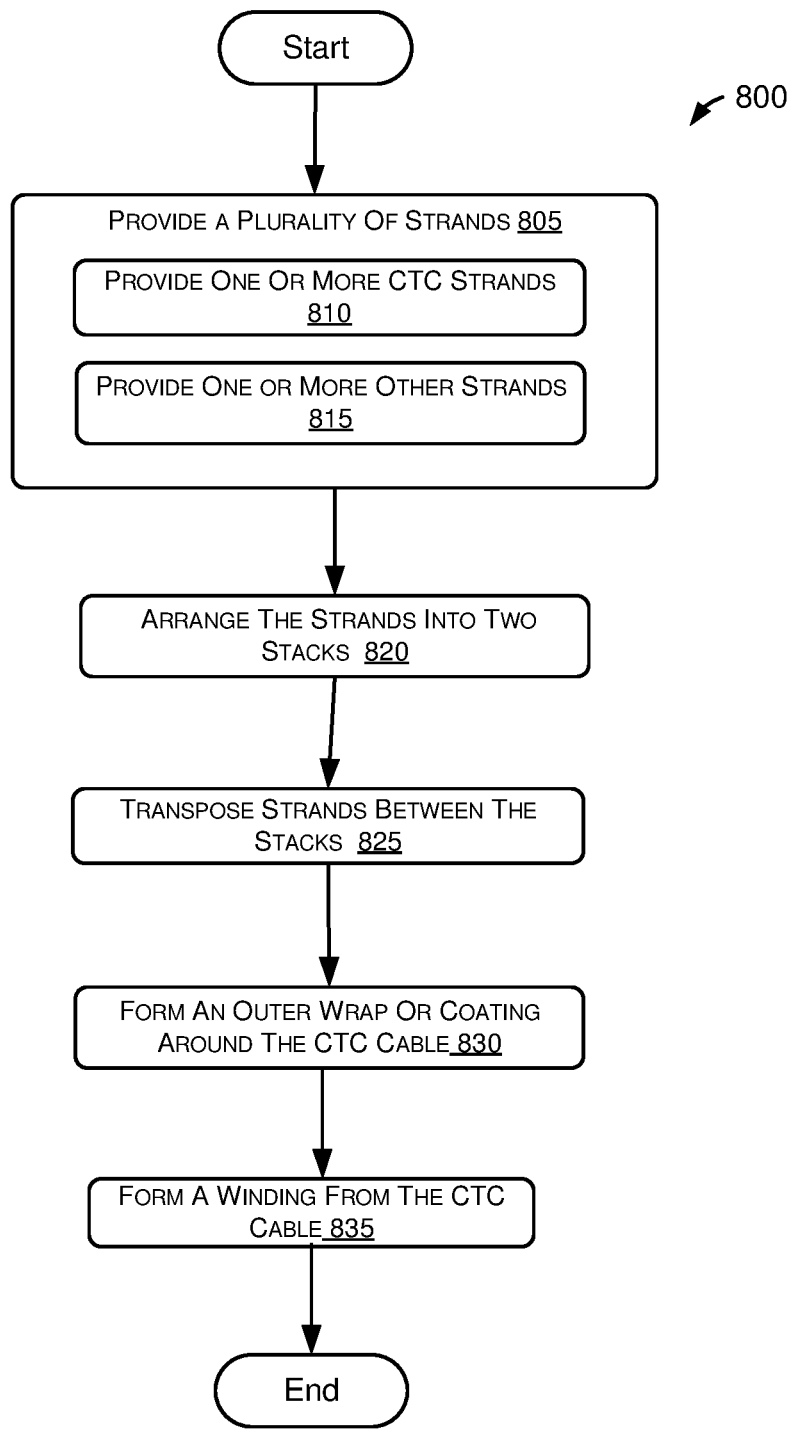
FIG. 8 illustrates a flow chart of an example method for forming a CTC cable from a plurality of CTC strands, in accordance with an illustrative embodiment of the disclosure.

A wide variety of suitable methods and/or techniques may be utilized as desired to produce a component strand, CTC strand, and/or a CTC cable in accordance with various embodiments. A wide variety of suitable equipment, systems, machines, and/or devices may be utilized in conjunction with these manufacturing techniques. FIG. 6 illustrates an example method 600 for forming a component strand for use in a CTC strand, such as the CTC strands 105, 200 illustrated in FIGS. 1 and 2. FIG. 7 illustrates an example method 700 for forming a CTC strand from a plurality of component strands, such as the plurality of component strands formed in accordance with the method of FIG. 6. FIG. 8 illustrates an example method 800 for forming a CTC cable from a plurality of strands that includes one or more CTC strands, such as one or more CTC strands formed in accordance with the method 700 illustrated in FIG. 7. Each of the methods 600, 700, 800 are discussed in greater detail below.

Turning to FIG. 6, the method 600 for forming a component strand may begin at block 605. At block 605, one or more conductors may be provided for incorporation into a component strand. A wide variety of suitable techniques and/or a wide variety of suitable wire formation systems may be utilized to provide the conductor(s). For example, at block 610, a conductor may be drawn from a suitable input material (e.g., rod stock, a larger diameter conductor, etc.). As another example, at block 615, a conductor may be provided via a suitable continuous extrusion or conform machine. As yet another example, at block 620, a preformed conductor may be provided or received from a suitable payoff or source. In other words, a conductor may be preformed in an offline process or obtained from an external supplier. Thus, it may not be necessary to provide a wire formation system. The conductor may have any suitable dimensions as specified for a desired component strand.

Once a conductor is provided, the conductor may optionally be passed through any number of other process components prior to reaching a downstream component or system that forms insulation. For example, the conductor may be passed through one or more cleaning apparatus and/or an annealer. At block 625, one or more layers of insulation material may be formed around or partially around the conductor. A wide variety of suitable types of insulation layers may be formed as desired, such as one or more semi-conductive layers, one or more tape layers, one or more enamel layers, and/or one or more extruded layers. For example, at block 630, one or more layers of enamel may be formed on the conductor. In the event that one or more enamel layers are formed, the conductor may be passed through one or more enameling ovens. In certain embodiments, one or more dies may be incorporated into the enameling oven or provided prior to a conductor entering the oven, and varnish may be applied to the conductor as it is passed through the die(s). In other embodiments, varnish may be dripped onto the conductor, wiped onto the conductor, provided via a varnish bath, or otherwise provided either prior to or after the conductor enters the enameling oven. After application of the varnish, the enameling oven may heat cure the varnish and/or evaporate any solvents mixed or blended with the varnish in order to complete the formation of an enamel layer. The process for applying an enamel layer to the conductor may be repeated as many times as desired in order to obtain a desired enamel build thickness or characteristics.

As another example of forming insulation, at block 635, one or more layers of extruded material may be formed on a conductor. As desired, the temperature of the conductor and/or any underlying layers may be controlled prior to the extrusion process via any suitable number of heating devices (e.g., heating coils, ovens, heaters, etc.) and/or cooling devices. In certain embodiments, controlling or maintaining a desired temperature (e.g., approximately 200° C. or greater, approximately 380° C. or greater, etc.) may facilitate adhesion between extruded insulation material and an underling conductor or base layer(s) and may eliminate the need for a separate adhesive layer. A wide variety of suitable extrusion devices may be configured to extrude polymeric or other suitable insulation material. These devices may include any number of suitable extrusion heads and/or other devices configured to apply a desired amount of material. As desired, the flow rates of the extruded material may be controlled in order to obtain a desired thickness. Additionally, in certain embodiments, one or more extrusion dies may be utilized to control the thickness and/or shape of the extruded insulation. In embodiments in which a component strand includes a plurality of conductors, extruded material may be either separately formed on each of the conductors or, alternatively, extruded between and at least partially around the plurality of conductors. Following the formation of insulation, the temperature of the conductor and associated insulation may be controlled as desired, for example, to attain a desired crystallinity and/or to control other suitable insulation properties.

In the event that a component strand includes a plurality of conductors (e.g., a plurality of individually insulated conductors, etc.), a joining coating may optionally be provided in order to bond or join the conductors together. In certain embodiments, a joining coating may be formed on surfaces between adjacent conductors. In other embodiments, a joining coating may be formed on surfaces between adjacent conductors and partially around the conductors. In yet other embodiments, a joining coating may be formed bother between adjacent conductors and around the conductors.

At block 640, a bond layer may optionally be formed on the component strand. For example, one or more dies may be utilized to apply a bond material to the conductor. In certain embodiments, the bond material may be applied in a liquid form, and the strand may be cooled in order to solidify the bond material. In this regard, the strand may later be heated in order to activate the bond material. The method 600 may then end following block 640.

As desired, a plurality of the operations involved in forming a component strand may be performed in a tandem or continuous manner. For example, a conductor may be drawn or otherwise provided, and one or more layers of insulation (e.g., a base layer, an extruded layer, etc.) may be formed in a tandem or in-line manner. Alternatively, a conductor may be taken up between one or more operations of the strand formation process. To the extent that operations are formed in a tandem manner, one or more synchronization devices may be utilized, such as capstans, dancers, flyers, load cells, and/or various combinations thereof. As desired, the synchronization device(s) may be controlled by one or more suitable controllers (e.g., programmable logic controllers, computers, microcontrollers, embedded controllers, servers, other computing devices, etc.) in order to match or approximately match an operational speed of the tandem processes and/or devices.

Turning now to FIG. 7, an example method 700 for forming a CTC strand from a plurality of component strands is illustrated. The method 700 may begin at block 705, and a plurality of component strands may be provided. In certain embodiments, each of the strands may include insulation material formed on one or more associated conductors. For example, each of the strands may be formed in accordance with the method 600 of FIG. 6.

At block 710, the provided component strands may be arranged into two stacks and, at block 715, at least a portion of the strands may be selectively interposed between the two stacks in order to form a CTC strand. For example, one or two strands (e.g., a top and/or bottom strand, etc.) may be transposed at a time until a desired number of transpositions has been attained. Additionally, any suitable pitch (e.g., any of the pitches discussed above with reference to FIG. 2, etc.) may be utilized for each transposition. Optionally, a suitable separator may be positioned between the two stacks. In certain embodiments, the component strands may be interposed such that each component strand successively and repeatedly takes on each possible position within a cross-section of the CTC strand. In certain embodiments, the plurality of component strands may be configured or adapted to be connected in parallel at their ends, for example, when incorporated into a CTC cable, motor, or other application. A wide variety of suitable CTC stranding devices and/or systems may be utilized to form the CTC strand from the component strands.

In certain embodiments, one or more fillers may be incorporated into the CTC strand during and/or after the transposition process to fill any gaps between transposed component strands and/or to provide the CTC strand with a desired overall cross-sectional shape. For example, as each transposition is made or relatively soon after a transposition is made, a filler may be inserted, applied, extruded, or formed. As another example, one or more fillers may be added or inserted after a desired longitudinal length of the CTC strand including a plurality of transpositions has been manufactured.

Additionally, in certain embodiments, the formation of a plurality of component strands and the formation of a CTC strand from the component strands may be completed in a tandem process. In other embodiments, the formation of the component strands and the CTC strands may be completed in separate offline processes. For example, formed component strands may be accumulated and taken up, and the component strands may subsequently be provided to a CTC stranding device to form a CTC strand.

At block 720, which may be optional in certain embodiments, the component strands of the CTC strand may be consolidated together. A wide variety of suitable processes and/or techniques may be utilized to consolidate the strands. In certain embodiments, an outer wrap or coating may be formed around the CTC strand. For example, a paper wrap or polymeric tape wrap may be formed around the CTC strand. As another example, an extruded outer coating may be formed around the CTC strand. As another example, both an outer wrap and an extruded outer coating may be formed. An outer wrap or coating may be formed from any suitable material and/or combination of materials. In certain embodiments, a bond layer may optionally be formed on a CTC strand either on an outer wrap or coating or, alternatively, without an outer wrap or coating. For example, one or more dies may be utilized to apply a bond material to the CTC stand. In certain embodiments, the bond material may be applied in a liquid form, and the CTC strand may be cooled in order to solidify the bond material. In this regard, the CTC strand may later be heated in order to activate the bond material. The method 700 may end following block 720.

Turning now to FIG. 8, an example method 800 for forming a CTC cable from a plurality of CTC strands and optionally other strands (e.g., one or more non-CTC strands) is illustrated. The method 800 may begin at block 805, and a plurality of strands may be provided. For example, one or more CTC strands, such as any of the CTC strands discussed above with reference to FIGS. 2-5F and/or the CTC strand discussed with reference to the method 700 of FIG. 7, may be provided at block 810. In certain embodiments, one or more other strands or non-CTC strands may be provided at block 815. For example, any of the non-CTC strands discussed above with reference to FIG. 1 may be provided for combination with one or more CTC strands.

At block 820, the provided strands may be arranged into two stacks and, at block 825, at least a portion of the strands may be selectively interposed between the two stacks in order to form a CTC cable. For example, one or two strands (e.g., a top and/or bottom strand, etc.) may be transposed at a time until a desired number of transpositions has been attained. Additionally, any suitable pitch (e.g., any of the pitches discussed above with reference to FIG. 1, etc.) may be utilized for each transposition and/or any suitable degree of rotation may be attained in the CTC cable. Optionally, a suitable separator may be positioned between the two stacks. In certain embodiments, the strands may be interposed such that each strand successively and repeatedly takes on each possible position within a cross-section of the CTC cable. Additionally, in certain embodiments, the plurality of strands may be configured or adapted to be connected in parallel at their ends, for example, when incorporated into a motor or other application. A wide variety of suitable CTC stranding devices and/or systems may be utilized to form the CTC cable from the strands.

In certain embodiments, one or more fillers may be incorporated into the CTC cable during and/or after the transposition process in order to fill any gaps between transposed strands and/or to provide the CTC cable with a desired overall cross-sectional shape. For example, as each transposition is made or relatively soon after a transposition is made, a filler may be inserted, applied, extruded, or formed. As another example, one or more fillers may be added or inserted after a desired longitudinal length of the CTC cable including a plurality of transpositions has been manufactured. As set forth above, filler(s) may be positioned at any suitable locations within a CTC cable and any number of suitable fillers may be utilized. Additionally, in certain embodiments, the formation of a plurality of strands and the formation of a CTC cable from the strands may be formed in a tandem process. In other embodiments, the formation of the strands and the CTC cable may be formed in separate offline processes. For example, formed strands may be accumulated and taken up, and the strands may subsequently be provided to a CTC stranding device to form a CTC cable.

At block 830, which may be optional in certain embodiments, the strands of the CTC cable may be consolidated together. A wide variety of suitable processes and/or techniques may be utilized to consolidate the strands. In certain embodiments, an outer wrap or coating may be formed around the CTC cable. For example, a paper wrap or polymeric tape wrap may be formed around the CTC cable. As another example, an extruded outer coating may be formed around the CTC cable. As another example, both an outer wrap and an extruded outer coating may be formed. An outer wrap or coating may be formed from any suitable material and/or combination of materials. In certain embodiments, once the strands have been transposed and after one or more optional outer wraps or layers have been formed, one or more suitable markings may be printed or otherwise formed on an outer surface of the CTC cable. For example, one or more markings that identify each transposed section may be formed on an outer surface. These markings may facilitate relatively easier assembly of the CTC cable into a desired application. As another example, one or more alphanumeric characters (e.g., text, a company name, etc.) and/or logos may be printed or otherwise formed on an outer surface of the CTC cable.

At block 835, a wide variety of suitable configurations may optionally be formed utilizing the CTC cable. For example, a suitable winding or other CTC structure may be formed for a motor, generator, rotating machine, load reactor, transformer, stator, or other electrical device. Typically, a winding is formed in an offline manner subsequent to formation of a CTC cable. For example, a CTC manufacturer may form the CTC cable, and the cable may be shipped to a motor or other electrical device manufacturer that subsequently forms a suitable winding. In certain embodiments, a relatively continuous winding may be incorporated into an electrical device. In other embodiments, a CTC cable may be divided into sections having desired lengths, and sections of a winding (e.g., hairpins, etc.) may be formed from each of the sections. Optionally, once the winding is formed, the CTC cable may be heated in order to activate the bond layers incorporated into the CTC cable. The method 800 may end following block 835.

The operations described and shown in the methods 600, 700, 800 of FIGS. 6-8 may be carried out or performed in any suitable order as desired in various embodiments. Additionally, in certain embodiments, at least a portion of the operations may be carried out in parallel. Furthermore, in certain embodiments, less than or more than the operations described in FIGS. 6-8 may be performed.

Conditional language, such as, among others, "can," "could," "might," or "may," unless specifically stated otherwise, or otherwise understood within the context as used, is generally intended to convey that certain embodiments could include, while other embodiments do not include, certain features, elements, and/or operations. Thus, such conditional language is not generally intended to imply that features, elements, and/or operations are in any way required for one or more embodiments or that one or more embodiments necessarily include logic for deciding, with or without user input or prompting, whether these features, elements, and/or operations are included or are to be performed in any particular embodiment.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A continuously transposed conductor (CTC) cable comprising:
    a plurality of electrically insulated strands arranged in first and second stacks with the plurality of strands successively transposed between the first and second stacks, wherein the plurality of strands comprises:
        at least one strand comprising a plurality of component strands that are arranged in third and fourth stacks with the plurality of component strands successively transposed between the third and fourth stacks,
        wherein each of the plurality of component strands comprises a conductor and insulation formed at least partially around the conductor.

2. The CTC cable of claim 1, wherein each of the plurality of strands comprises a plurality of component strands that are transposed between respective third and fourth stacks.

3. The CTC cable of claim 1, wherein the plurality of electrically insulated strands comprises between three and one hundred strands.

4. The CTC cable of claim 1, wherein the plurality of electrically insulated strands comprises between three and eleven strands.

5. The CTC cable of claim 1, wherein the plurality of component strands comprises between three and one hundred component strands.

6. The CTC cable of claim 1, wherein the plurality of component strands comprises between three and eleven component strands.

7. The CTC cable of claim 1, wherein at least one of the plurality of component strands comprises a plurality of conductors joined or bonded together.

8. The CTC cable of claim 1, further comprising one of (i) a wrap or (ii) an extruded coated formed around the plurality of transposed strands.

9. The CTC cable of claim 1, further comprising one of (i) a wrap or (ii) an extruded coating formed around the plurality of transposed component strands.

10. The CTC cable of claim 1, wherein at least a portion of the plurality of strands further comprise a bond layer formed on the insulation.

11. The CTC cable of claim 1, wherein at least a portion of the plurality of component strands further comprise a bond layer formed on the insulation.

12. A continuously transposed conductor (CTC) cable comprising:
    a plurality of electrically insulated strands arranged in two stacks and successively transposed between the two stacks, wherein the plurality of strands comprises one or more strands that are formed as smaller continuously transposed conductors,
    wherein each smaller continuously transposed conductor comprises a respective plurality of component strands that are transposed between two component strand stacks,
        wherein each of the plurality of component strands comprises a conductor and insulation formed at least partially around the conductor.

13. The CTC cable of claim 12, wherein each of the plurality of strands comprises a smaller continuously transposed conductor.

14. The CTC cable of claim 12, wherein the plurality of electrically insulated strands comprises between three and one hundred strands.

15. The CTC cable of claim 12, wherein the plurality of electrically insulated strands comprises between three and eleven strands.

16. The CTC cable of claim 12, wherein the plurality of component strands comprises between three and one hundred component strands.

17. The CTC cable of claim 12, wherein the plurality of component strands comprises between three and eleven component strands.

18. The CTC cable of claim 12, wherein at least one of the plurality of component strands comprises a plurality of conductors joined or bonded together.

19. The CTC cable of claim 12, further comprising one of (i) a wrap or (ii) an extruded coating formed around the plurality of transposed strands.

20. The CTC cable of claim 12, wherein at least one smaller continuously transposed conductor comprises one of (i) a wrap or (ii) an extruded coating formed around the plurality of transposed component strands.

21. The CTC cable of claim 12, wherein at least a portion of the plurality of strands further comprise a bond layer formed on the insulation.

22. The CTC cable of claim 12, wherein at least a portion of the plurality of component strands further comprise a bond layer formed on the insulation.

* * * * *